US008188936B2

(12) United States Patent  (10) Patent No.: US 8,188,936 B2
Fuller et al.  (45) Date of Patent: May 29, 2012

(54) CONTEXT AWARE AUXILIARY DISPLAY PLATFORM AND APPLICATIONS

(75) Inventors: Andrew J. Fuller, Redmond, WA (US); Matthew P. Rhoten, Kirkland, WA (US); Juan J. Perez, Seattle, WA (US); Christopher A. Schoppa, Redmond, WA (US); Curt A. Steeb, Redmond, WA (US); Niels van Dongen, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 288 days.

(21) Appl. No.: 12/415,979

(22) Filed: Mar. 31, 2009

(65) Prior Publication Data

US 2010/0066642 A1  Mar. 18, 2010

Related U.S. Application Data

(63) Continuation of application No. 10/837,894, filed on May 3, 2004, now Pat. No. 7,511,682.

(51) Int. Cl.
  *G09G 5/00*  (2006.01)
(52) U.S. Cl. ........................................................ 345/2.1
(58) Field of Classification Search ............ 345/1.1–3.1; 701/213; 707/9
  See application file for complete search history.

(56) References Cited

U.S. PATENT DOCUMENTS

| 4,004,277 A | 1/1977 | Gavril |
| 5,193,064 A * | 3/1993 | Maki ............................ 701/221 |
| 5,363,502 A | 11/1994 | Kagimasa |
| 5,649,023 A | 7/1997 | Barbara |
| 5,745,105 A | 4/1998 | Kim |
| 5,825,336 A | 10/1998 | Fujita |
| 5,910,799 A | 6/1999 | Carpenter |
| 5,960,214 A | 9/1999 | Sharpe |
| 6,035,339 A | 3/2000 | Agraharam |
| 6,096,096 A | 8/2000 | Murphy |

(Continued)

FOREIGN PATENT DOCUMENTS

JP  2000322358  11/2000

(Continued)

OTHER PUBLICATIONS

Definition of "Driver", www.searchstorage.com, Nov. 9, 2003, http://searchstorage.techtarget.com/sDefinition/0,,sid5_gci212002,00.html, Accessed Jul. 13, 2007.

(Continued)

*Primary Examiner* — Sumati Lefkowitz
*Assistant Examiner* — Robert E Carter, III
(74) *Attorney, Agent, or Firm* — Workman Nydegger

(57) ABSTRACT

Described is a mechanism by which application programs (or plug-ins) and an auxiliary service adjust the output and/or data available for output on an auxiliary device based on changes detected in the current context of the auxiliary display. Context sensors detect and report changes in context, whereby some action is taken with respect to what information is displayed or can be displayed on the auxiliary display device. Examples of context data that can change include the physical location of the display, detected movement or motion data, presence of a particular user or others, power state, network connectivity status, privacy status and so forth. The auxiliary device can have context as to its position relative to the main display. Information sensitivity levels may be used to specify whether an application program's data can be displayed, based on the perceived sensitivity of the information and the user's current context.

19 Claims, 10 Drawing Sheets

U.S. PATENT DOCUMENTS

| | | |
|---|---|---|
| 6,191,758 B1 | 2/2001 | Lee |
| 6,268,837 B1 | 7/2001 | Kobayashi |
| 6,281,893 B1 * | 8/2001 | Goldstein ............... 715/733 |
| 6,327,482 B1 | 12/2001 | Miyashita |
| 6,347,339 B1 | 2/2002 | Morris et al. |
| 6,370,629 B1 | 4/2002 | Hastings |
| 6,384,801 B1 | 5/2002 | Takahashi |
| 6,415,418 B1 | 7/2002 | McLaughlin |
| 6,438,577 B1 | 8/2002 | Owens |
| 6,694,389 B2 | 2/2004 | Coates |
| 6,750,830 B1 | 6/2004 | Teshima |
| 6,912,664 B2 | 6/2005 | Ranganathan |
| 6,944,818 B2 | 9/2005 | Newman |
| 6,947,772 B2 | 9/2005 | Minear |
| 6,989,801 B2 | 1/2006 | Bruning |
| 7,024,415 B1 | 4/2006 | Kreiner |
| 7,030,837 B1 | 4/2006 | Vong |
| 7,047,339 B2 | 5/2006 | Oakley |
| 7,051,196 B2 | 5/2006 | Angelo |
| 7,092,943 B2 * | 8/2006 | Roese et al. ............... 1/1 |
| 7,123,212 B2 | 10/2006 | Acharya |
| 7,136,676 B2 | 11/2006 | Lee |
| 7,152,171 B2 | 12/2006 | Chandley |
| 7,155,253 B2 | 12/2006 | Sawayama |
| 7,187,951 B2 | 3/2007 | Kaida |
| 7,221,331 B2 | 5/2007 | Bear |
| 7,225,410 B2 | 5/2007 | Kimmo |
| 7,231,529 B2 | 6/2007 | Park |
| 7,240,228 B2 | 7/2007 | Bear |
| 7,249,323 B2 | 7/2007 | Ageta |
| 7,286,112 B2 | 10/2007 | Kinjo |
| 7,356,570 B1 | 4/2008 | Tuli |
| 7,356,706 B2 | 4/2008 | Scheurich |
| 7,443,971 B2 | 10/2008 | Bear |
| 7,558,884 B2 | 7/2009 | Fuller |
| 7,577,771 B2 | 8/2009 | Steeb |
| 2001/0007140 A1 | 7/2001 | Landry |
| 2001/0028366 A1 | 10/2001 | Ohki |
| 2002/0129006 A1 | 9/2002 | Emmett |
| 2002/0133601 A1 | 9/2002 | Kennamer |
| 2002/0140626 A1 * | 10/2002 | Chang ............... 345/1.1 |
| 2003/0006942 A1 | 1/2003 | Searls |
| 2003/0043110 A1 | 3/2003 | Chaves |
| 2003/0115415 A1 | 6/2003 | Want |
| 2003/0154492 A1 | 8/2003 | Falvo |
| 2003/0216143 A1 | 11/2003 | Roese et al. |
| 2004/0064728 A1 * | 4/2004 | Scheurich ............... 713/201 |
| 2004/0233930 A1 | 11/2004 | Colby |
| 2004/0260427 A1 * | 12/2004 | Wimsatt ............... 700/275 |
| 2005/0005001 A1 | 1/2005 | Hara |
| 2005/0066089 A1 | 3/2005 | Karaoguz |
| 2005/0073471 A1 | 4/2005 | Selbrede |
| 2005/0192922 A1 | 9/2005 | Edlund |
| 2005/0243021 A1 | 11/2005 | Perez |
| 2006/0194549 A1 | 8/2006 | Janik |

FOREIGN PATENT DOCUMENTS

| | | |
|---|---|---|
| JP | 2002275250 | 9/2002 |
| WO | WO00/60450 | * 10/2000 |
| WO | WO 01/75684 | 10/2001 |

OTHER PUBLICATIONS

U.S. Appl. No. 10/837,895, mailed Feb. 28, 2008, Office Action.
U.S. Appl. No. 10/837,900, mailed May 8, 2008, Office Action.
U.S. Appl. No. 10/838,174, mailed Jul. 26, 2007, Office Action.
U.S. Appl. No. 10/838,174, mailed Jan. 28, 2008, Office Action.
U.S. Appl. No. 10/837,894, mailed Aug. 14, 2007, Office Action.
U.S. Appl. No. 10/837,894, mailed Dec. 27, 2007, Office Action.
U.S. Appl. No. 10/838,174, mailed May 21, 2008, Office Action.
U.S. Appl. No. 10/837,900, mailed Aug. 5, 2008, Office Action.
U.S. Appl. No. 10/838,174, mailed Nov. 12, 2008, Office Action.
U.S. Appl. No. 10/837,900, mailed Nov. 20, 2008, Office Action.
U.S. Appl. No. 10/837,895, mailed Dec. 1, 2008, Office Action.
U.S. Appl. No. 10/838,174, mailed Apr. 21, 2009, Office Action.
U.S. Appl. No. 10/837,894, mailed Dec. 30, 2008, Notice of Allowance.
U.S. Appl. No. 10/837,895, mailed Mar. 30, 2009, Notice of Allowance.
U.S. Appl. No. 10/837,900, mailed May 20, 2009, Notice of Allowance.
U.S. Appl. No. 10/838,174, mailed Sep. 16, 2009, Notice of Allowance.

* cited by examiner

US 8,188,936 B2

CONTEXT AWARE AUXILIARY DISPLAY PLATFORM AND APPLICATIONS

CROSS-REFERENCE TO RELATED APPLICATIONS

The application is a continuation of copending U.S. patent application Ser. No. 10/837,894, filed on May 3, 2004 and entitled "CONTEXT-AWARE AUXILIARY DISPLAY PLATFORM AND APPLICATIONS," which is hereby incorporated herein by this reference.

BACKGROUND

1. Field of the Invention

The invention relates generally to computer systems, and more particularly to an improved method and system for display of information on a computing device.

2. Background of the Invention

U.S. patent application Ser. Nos. 10/429,930 and 10/429,932 are generally directed towards the concept of computer systems having auxiliary processing and auxiliary mechanisms, particularly display-related mechanisms, which provide some auxiliary computing functionality. For example, a small LCD on the lid or side of a laptop computer can provide its owner with useful information, such as a meeting location and time, even when the main computer display is not easily visible, such as when a laptop computer's lid is closed and/or the main computer is powered down.

However, the usage of such auxiliary displays has heretofore been limited to narrow, limited operations in which a dedicated auxiliary display program is customized for the type of display and with respect to the information that is displayed. In such systems, the auxiliary display program is coded to the specifics of the type of display, such as the size and resolution, so that the program can output something that is readable yet fits within the screen area. This is unlike the regular computer system display, in which contemporary operating system components abstract from higher level programs the complexity and details of whatever specific video graphics adapter is installed.—At the same time, dedicated auxiliary display code was a sensible solution, given that auxiliary displays typically have been two-or-three line text displays built into the hardware when manufactured, and all that was needed was to have the dedicated application write simple text with information such as a meeting time and the current time to the display.

One problem with the dedicated solution is that what is desirable to display in one context might not be desirable in others. For example, although notification of an upcoming meeting is desirable, once in the meeting, it would typically not be desirable to have other attendees be able to view other information that might appear on the auxiliary display. A simple on/off switch is not sufficient for many scenarios, such as when the display of some information, but not other (e.g., personal) information, is what a user really wants.

What is needed is a way for application programs that run under the main operating system of a computer system to automatically present on an auxiliary device only the data that is desirable for displaying given the current context.

SUMMARY OF THE INVENTION

Briefly, the present invention provides a mechanism by which application programs (or their plug-ins for handling auxiliary devices communications) and an auxiliary service work together to adjust for changes detected in the current context of the auxiliary display. One or more context sensors may detect the change in context, and report it to the main computer system and/or the auxiliary device, whereby some action is taken, such as with respect to what information is displayed or can be displayed on the auxiliary display device. Other types of actions resulting from context-related events flowing through the auxiliary devices system are able to cause permanent or temporary changes to the main (host) computer system.

In an offline state in which a main computer system is not running but an auxiliary device is running, the change in context can have some effect on cached application program and other data, such as to interpret or use the cached data differently based on the current context state, or to possibly add to or delete from the cached data. The application can register (or query) for the particular context-sensitive behavior before the system goes offline. The auxiliary device can thus send context-sensitive events as they are detected or some appropriate time after detection, or can maintain context-related data for responding to a query. The auxiliary device can also obtain the context-related data on-demand, such as in response to an application program query, and/or can occasionally poll one or more sensors as appropriate. The auxiliary device can also re-send context-related events, such as for the benefit of applications that were not running and/or registered at the time the event was last sent.

When in an online state in which both the main computer system and the auxiliary device are operating, context changes may be communicated to the online application programs and/or the operating system components. Such context based-events are used by the application programs, operating system and/or auxiliary device as each sees fit; as a result, the context changes can temporarily or permanently change the main computer system and/or auxiliary device, e.g., by changing a registry or other setting. Note that changes reported to the main computer system's programs may have occurred at a time when the main computer system was offline, and if so are preserved by the auxiliary device and reported when the main computer system comes back online.

Application and other programs (such as operating system components) that have registered for use of the auxiliary display may also register for particular context-change notifications, such as context corresponding to a physical location of the display, movement or motion data, presence of a particular user or others, power state, network connectivity status, privacy status and so forth. Plug-ins can register as to whether they are to be available in the offline or online power states, or both.

The auxiliary device can also have a registered context associated therewith respect to where the auxiliary device is located relative to the main display, that is, able to be seen when the main screen is visible or not, or independent of the main screen.

When developing an auxiliary display plug-in, the developer may specify an appropriate context or contexts in which the application may be displayed, should be displayed (e.g., automatically upon a context change), or cannot be displayed. This is then known for the offline state, where applications are not running to adjust the output. In the online state, the auxiliary service may communicate any change in context event to the plug-in, which may adjust its future output accordingly. In one implementation, when a context state change occurs, the auxiliary service enumerates the list of enabled plug-ins to determine if any plug-ins should be added or removed based on that context change. When running in the offline state, the firmware or operating system running on the auxiliary processor can apply the same context filter to disable plug-ins that are no longer relevant in the offline power state. Alternatively, a different filter can be applied.

Information sensitivity levels may be used by the plug-ins to specify whether the plug-in's data can be displayed, based on the perceived sensitivity of the information and the user's current context. The context may be selected by the user based on a current situation and passed to the auxiliary service or firmware. A heuristic determines what level of information should be shown, based on the user selected context and other pertinent information.

Other advantages will become apparent from the following detailed description when taken in conjunction with the drawings, in which:

DETAILED DESCRIPTION

Exemplary Operating Environment

Figure 1:
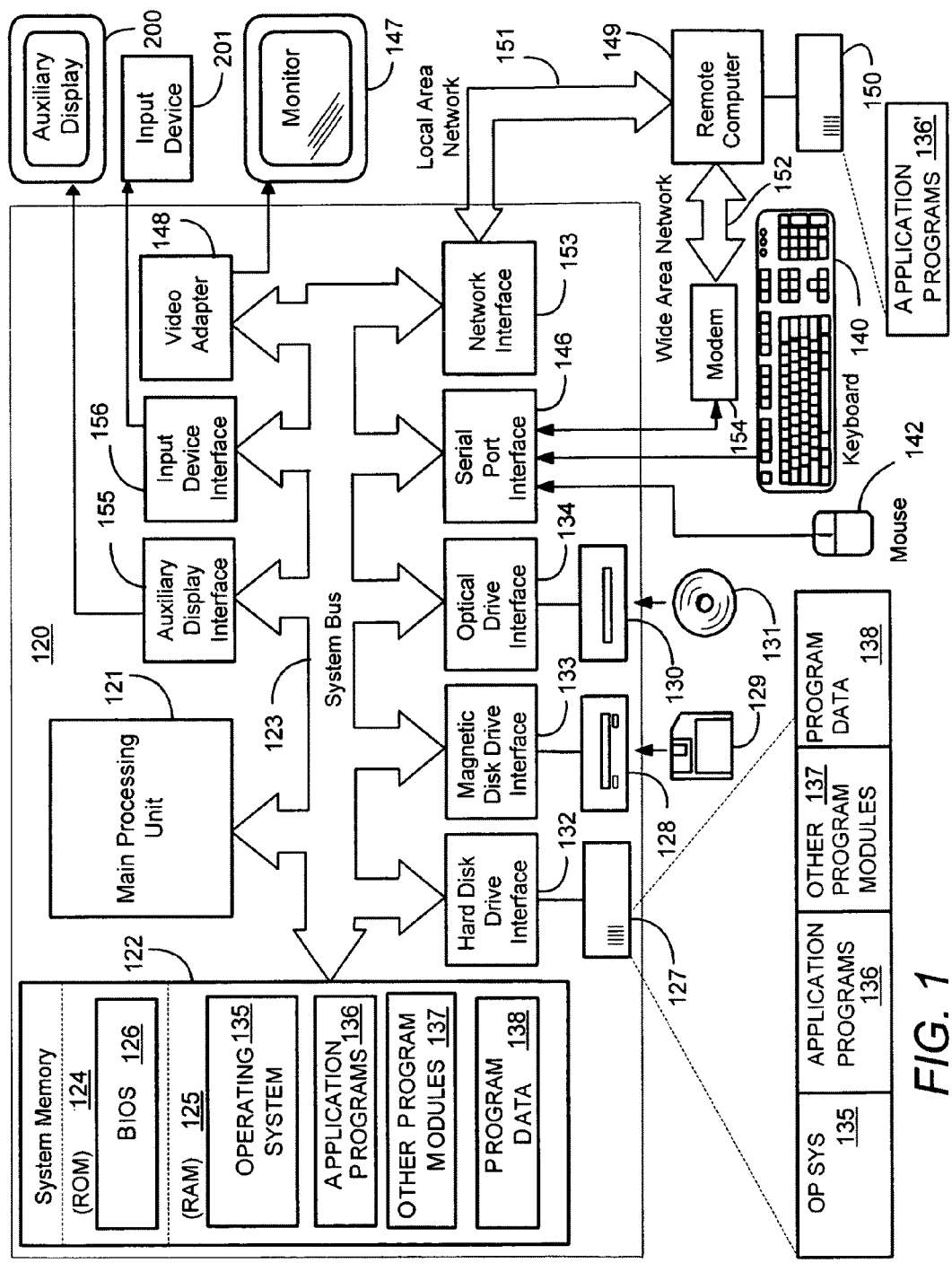
FIG. 1 is a block diagram representing a general purpose computing device in the form of a personal computer system into which the present invention may be incorporated.

FIG. 1 is a block diagram representing a computing device 120 in the form of a personal computer system into which the present invention may be incorporated. Those skilled in the art will appreciate that the personal computer system 120 depicted in FIG. 1 is intended to be merely illustrative and that the present invention may be practiced with other computer system configurations, including hand-held devices, multi-processor systems, microprocessor-based or programmable consumer electronics, network PCs, minicomputers, mainframe computers, headless servers and the like. The invention may also be practiced in distributed computing environments where tasks are performed by remote processing devices that are linked through a communications network. In a distributed computing environment, program modules may be located in both local and remote memory storage devices.

The personal computer system 120 included a processing unit 121, a system memory 122, and a system bus 123 that couples various system components including the system memory to the processing unit 121. The system bus 123 may be any of several types of bus structures including a memory bus or memory controller, a peripheral bus, and a local bus using any of a variety of bus architectures. The system memory includes read-only memory (ROM) 124 and random access memory (RAM) 125. A basic input/output system 126 (BIOS), containing the basic routines that help to transfer information between elements within the personal computer 120, such as during start-up, is stored in ROM 124. The personal computer 120 may further include a hard disk drive 127 for reading from and writing to a hard disk, not shown, a magnetic disk drive 128 for reading from or writing to a removable magnetic disk 129, and an optical disk drive 130 for reading from or writing to a removable optical disk 131 such as a CD-ROM or other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide non-volatile storage of computer readable instructions, data structures, program modules and other data for the personal computer 120. Although the exemplary computer system described herein employs a hard disk, a removable magnetic disk 129 and a removable optical disk 131, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary computer system.

A number of program modules may be stored on the hard disk, magnetic disk 129, optical disk 131, ROM 124 or RAM 125, including an operating system 135 (such as Windows® XP), one or more application programs 136 (such as Microsoft® Outlook), other program modules 137 and program data 138. A user may enter commands and information into the personal computer 120 through input devices such as a keyboard 140 and pointing device 142. Other input devices (not shown) may include a microphone, joystick, game pad, satellite dish, scanner or the like. These and other input devices are often connected to the processing unit 121 through a serial port interface 146 that is coupled to the system bus, but may be connected by other interfaces, such as a parallel port, game port or universal serial bus (USB). A monitor 147 or other type of display device is also connected to the system bus 123 via an interface, such as a video adapter 148. In addition to the monitor 147, personal computers typically include other peripheral output devices (not shown), such as speakers and printers. An auxiliary display 200 is an additional output device, and may, for example, be connected to the system bus 123 via an auxiliary display interface 155. An auxiliary display 101 may also connect to a computing device 20 through a serial interface or by other interfaces, such as a parallel port, game port, infrared or wireless connection, universal serial bus (USB) or other peripheral device connection. An input device 201 in FIG. 1 may provide one or more actuators to interface with and/or control the auxiliary display 200, and for example may be connected to the system bus 123 via input device interface 156, which may be a serial interface, or by other interfaces, such as a parallel port, game port, infrared or wireless connection, universal serial bus (USB) or other peripheral device connection.

The personal computer 120 may operate in a networked environment using logical connections to one or more remote computers, such as a remote computer 149. The remote computer 149 may be another personal computer, a server, a router, a network PC, a peer device or other common network node, and typically includes many or all of the elements described above relative to the personal computer 120, although only a memory storage device 150 has been illustrated in FIG. 1. The logical connections depicted in FIG. 1 include a local area network (LAN) 151 and a wide area network (WAN) 152. Such networking environments are commonplace in offices, enterprise-wide computer networks, Intranets and the Internet.

When used in a LAN networking environment, the personal computer 120 is connected to the local network 151 through a network interface or adapter 153. When used in a WAN networking environment, the personal computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the personal computer 120, or portions thereof, may be stored in the remote memory storage device. It will be appreciated that the network connections shown are exemplary and other means of establishing a communications link between the computers may be used.

It should be noted that the computer system need not be fully operational for an auxiliary display to work in accordance with the present invention. Indeed, as described below with reference to FIG. 6, an auxiliary display may still work when the computer is powered down, at least to a default extent or to an extent configured by a user, such as when the computer system is in a sleep state or a hibernate mode, and/or when the user has not yet logged on or is otherwise locked out of the system via security mechanisms. For example, the user may want a telephone handset and speakerphone that are integrated into a personal computer to work as conventional appliances when the computer system is powered down, and use the auxiliary display as a caller-IO device. This device may also store data for later transmission to the computer system when the computer system is again powered up, such as to log the calls received, including when the computer system was not fully powered up.

The auxiliary display may supplement the main display and may also serve as a surrogate display when the main display is shut down or otherwise not operational (e.g., disconnected), to give the user some information. For example, information such as how to power up the main display might be helpful, as would a room number and/or directions to a meeting on an auxiliary display device connected to a mobile computer that the user can view when the main display is off and/or not easily visible (e.g., the lid of a laptop is closed). Note that even on a tablet PC with a continually visible screen, the main display may be shut down to save power, whereby an auxiliary display may provide substantial benefits. Note that the user may limit the extent of the display based on the computer system state, e.g., when the user is not logged in, only certain non-sensitive or very specifically-controlled information may be displayed, and so forth.

To enable and control communication in these powered-down modes, firmware may exist, stored in non-volatile memory, that when loaded and operated on by a secondary processor, enables the auxiliary display, along with other auxiliary components to be used, as long as some power is available. Note that as used herein, the term "firmware" can be generally considered as representing the auxiliary memory, the code therein and/or the secondary processor on which it runs.

Figure 2A:
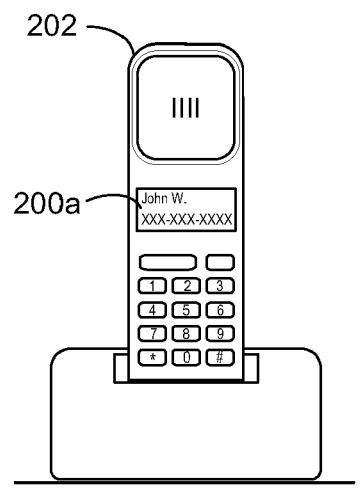
FIGS. 2A-2E are exemplary illustrations each generally representing a location for placement of an auxiliary display on various devices.
Figure 2B:
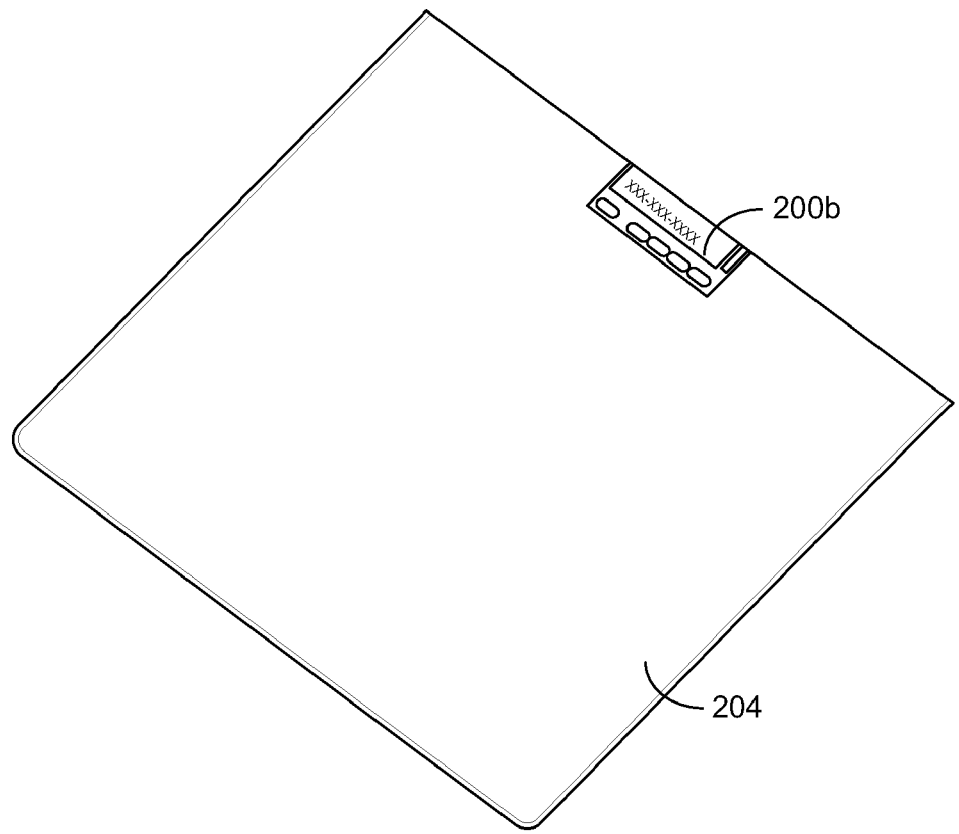
Figure 2C:
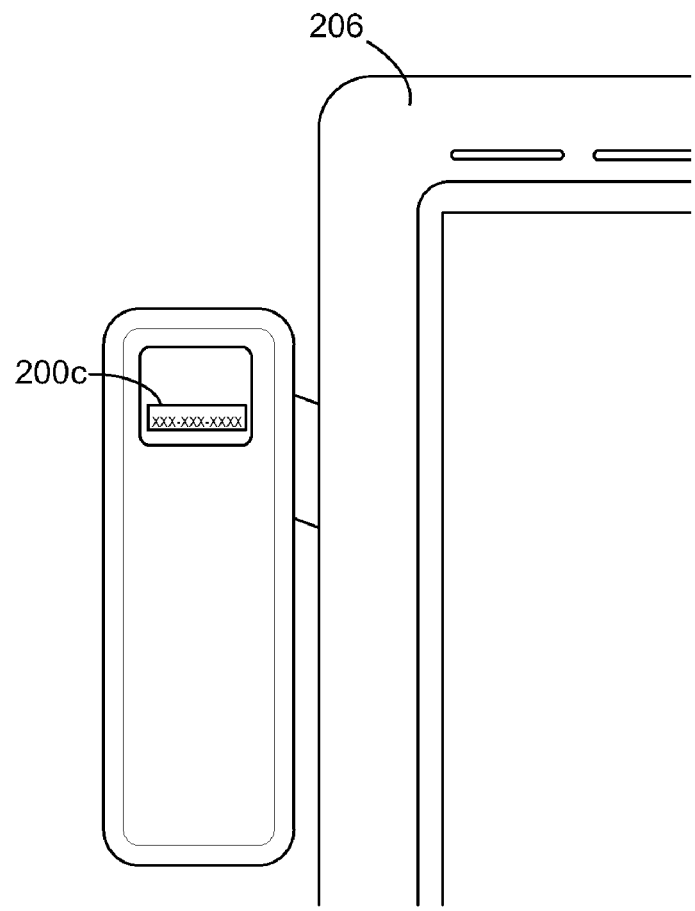
Figure 2D:
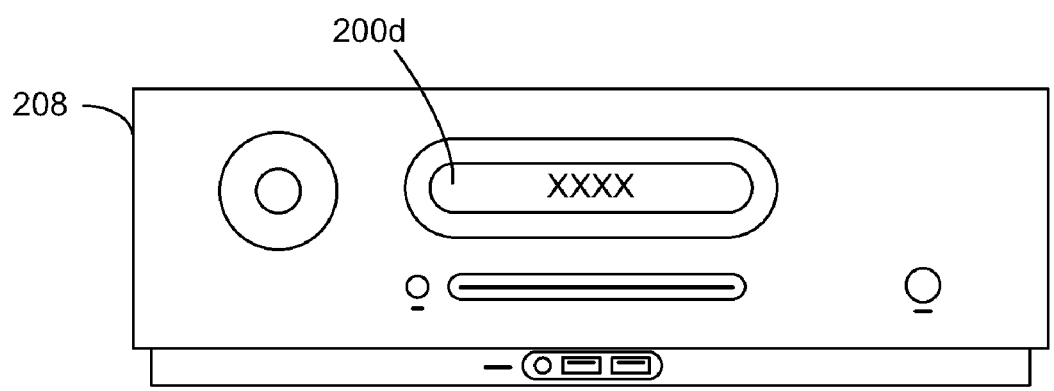
Figure 2E:
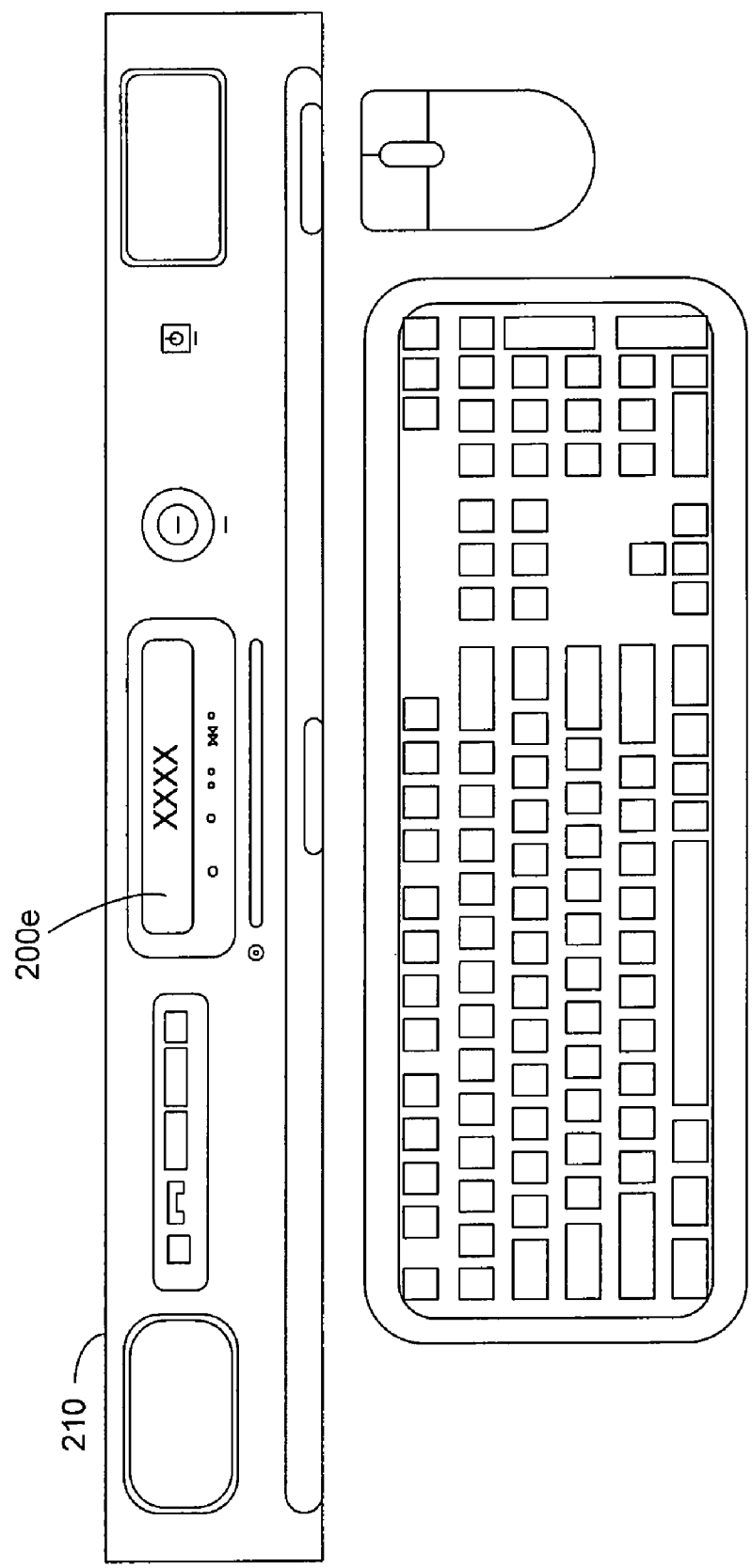

FIGS. 2A-2E illustrate exemplary locations on or associated with computing devices for placement of auxiliary display screens $200_a$-$200_e$, respectively. As represented in FIGS. 2A and 2B, an auxiliary display screen $200_a$ may be placed on the front, back or other surface of a standalone (landline or mobile) phone 202, (which need not be physically coupled if otherwise linked such as via Bluetooth technology) and/or another auxiliary display screen $200_b$ placed on the edge or lid of a mobile computer 204 or tablet computing device (not shown). Another place for an auxiliary display screen $200_c$ (FIG. 2C) may be on a phone mounted on a computer or a peripheral device attached to a computer such as on monitor 206 or on a keyboard (not shown). FIGS. 2D and 2E illustrate additional placements of auxiliary display screens $200d$ and $200_e$ on the front panel of a standalone console 208 connected to a computer, or some other housing 210 (such as a housing for the motherboard), respectively. Those skilled in the art will appreciate that an auxiliary display screen may be placed on any surface of any computing device or other device having display capabilities, such as placed on a watch with a wireless or other connection to a computer, on a remote control device, on a remote wall-mounted unit, and so forth.

As should be apparent from FIGS. 2A-2E, an auxiliary display may be in the form of any number of known types of displays such as one or more LEDs, a 2-line alphanumeric display, a monochrome display, or a color display. Those skilled in the art will appreciate that the present invention may also use the display of other computing or communication devices as the auxiliary display 200. These other computing or communication devices include general purpose computers, cell phones, and handheld devices such as a pager or a personal digital assistant (POA). Additionally, the present invention may use a virtual auxiliary display implemented within an area of the onscreen display of the computing device 120 (e.g. a screensaver or a component of the graphical user interface) as the auxiliary display 200, including before a user has logged in. The auxiliary display 200 may include a combination of any of the forms described above, and also be physically or logically combined with indicators such as one or more LEDs and/or used in conjunction with a virtual auxiliary display.

Even absent a screen, one or more LEDs may be advantageously used as the auxiliary display 200 for notification about the occurrence of an activity. Such an auxiliary display may be implemented with low costs and less power consumption and provide notification in an unobtrusive manner. It may be effective used for systems with extremely tight form factors or for systems where communications for users are managed by another person. An auxiliary display 200 may additionally be effective when notifications need to be seen from a distance. An auxiliary display also may be used in conjunction with an onscreen virtual auxiliary display when there is informational content associated with the activity, such as notification of a new email message. In this case, content from the email may also be displayed on the virtual auxiliary display 200. Furthermore, an auxiliary display 200 may be effectively used for public systems (libraries or kiosks) or shared computers when display of content is undesirable.

Alternatively, a 2-line alphanumeric display may be advantageously used as the auxiliary display 200 where cost or space is critical, but notifications and basic content are desired. It may be effectively used for tablet PCs, laptops, budget PCs, phone docking stations, monitor bezels, and small or low-cost PC appliances or peripherals such as a handset, keyboard, or remote control. It may also be effectively used as a replacement for (and an improvement to) a caller ID box.

Furthermore, a monochrome or color multi-line display may be advantageously used as the auxiliary display 200 for media-rich applications, high-end consumer systems or media center systems. It may be effectively used for high-end laptops with more generous form factors or where an emphasis is placed on communication, full-function PCs with a heavy business or communications emphasis, media centers or high-end media appliances (including remotes, console systems with portable media functionality) and mobile auxiliary displays. Additionally, the display of another computing or communication device may advantageously be used as the auxiliary display 200 where users can expand the role of these supplemental devices when using their PC. These other computing or communication devices include general purpose computers, cell phones, and handheld devices such as a pager or a personal digital assistant (POA). Further, note that the auxiliary display need not be an actual display, but can be a projection (e.g., onto a wall) of the information. An auxiliary display, as referred to herein, may be composed of essentially anything that can be sensed, including any visual, audible, and/or tactile representations.

As mentioned previously, a virtual auxiliary display may be used as the auxiliary display 200 for public systems (libraries or kiosks) or shared computers when display of content is undesirable. It may also be effectively used for low-cost systems or for devices with very minimal form factors that make even LEDs impractical. A virtual auxiliary display may be implemented as a screensaver or as a component of the graphical user interface.

The input device 201, hereinafter referred to as actuators (in plural, even if only a single mechanism such as a button or pointing device), provides the user with a mechanism to switch between different categories of application data or notifications such as email notifications, voicemail notifications, calendar notifications, system status notifications, caller 10 lists and other types of notification messages. Accompanying such a switch button may also be an up button and a down button to allow the user to scroll forward and backward through the notification messages within a particular category. Those skilled in the art will appreciate that any other types of actuators may be used, such as a keyboard, microphone, joystick, game pad or other device including a device that contains a biometric sensor, environmental sensor, position sensor, or other type of sensor. Any of the input devices of the computing device 120 that is represented in FIG. 1 may be used as the input device (actuators) 201, and may be used in conjunction with independent actuators.

Auxiliary Display System Architecture

As will be understood, the present invention provides an auxiliary display 200 for a user to simply and rapidly view information concerning peripheral tasks without distraction or the need to switch operating focus from the current task onscreen, if any. In keeping with the present invention, the user may select, to an extent, what information appears on the auxiliary display by using actuators 201 to select among application program data. Although program data and event notifications will be used to illustrate the auxiliary display of information, it should be understood that the present invention may provide auxiliary display of other types of information such as from Internet-related services including transaction services, auction services, advertising services, entertainment services, and location services. Such services can provide a wide variety of information including financial transaction information, headline news, stock quotes, sport scores, weather and other information, including information specifically requested by the user as well as unsolicited information. It will also be appreciated that the auxiliary display 201 may be operative using any number of known types of displays such as a set of notification lights, a 2-line alphanumeric display, a monochrome display, or a color display. Note that as used herein, for simplicity "auxiliary display device" will generally refer to the auxiliary display screen and/or the actuators associated with that screen as well as any other hardware, firmware or software in the device, however it should be understood that the screen and actuators may be independent mechanisms, and/or that there may not be actuators requiring physical contact to input data. Further, note that the auxiliary display device may be considered as possibly containing indicators (e.g., individual LEDs) instead of or in addition to a pixel-type display screen.

Figure 3:
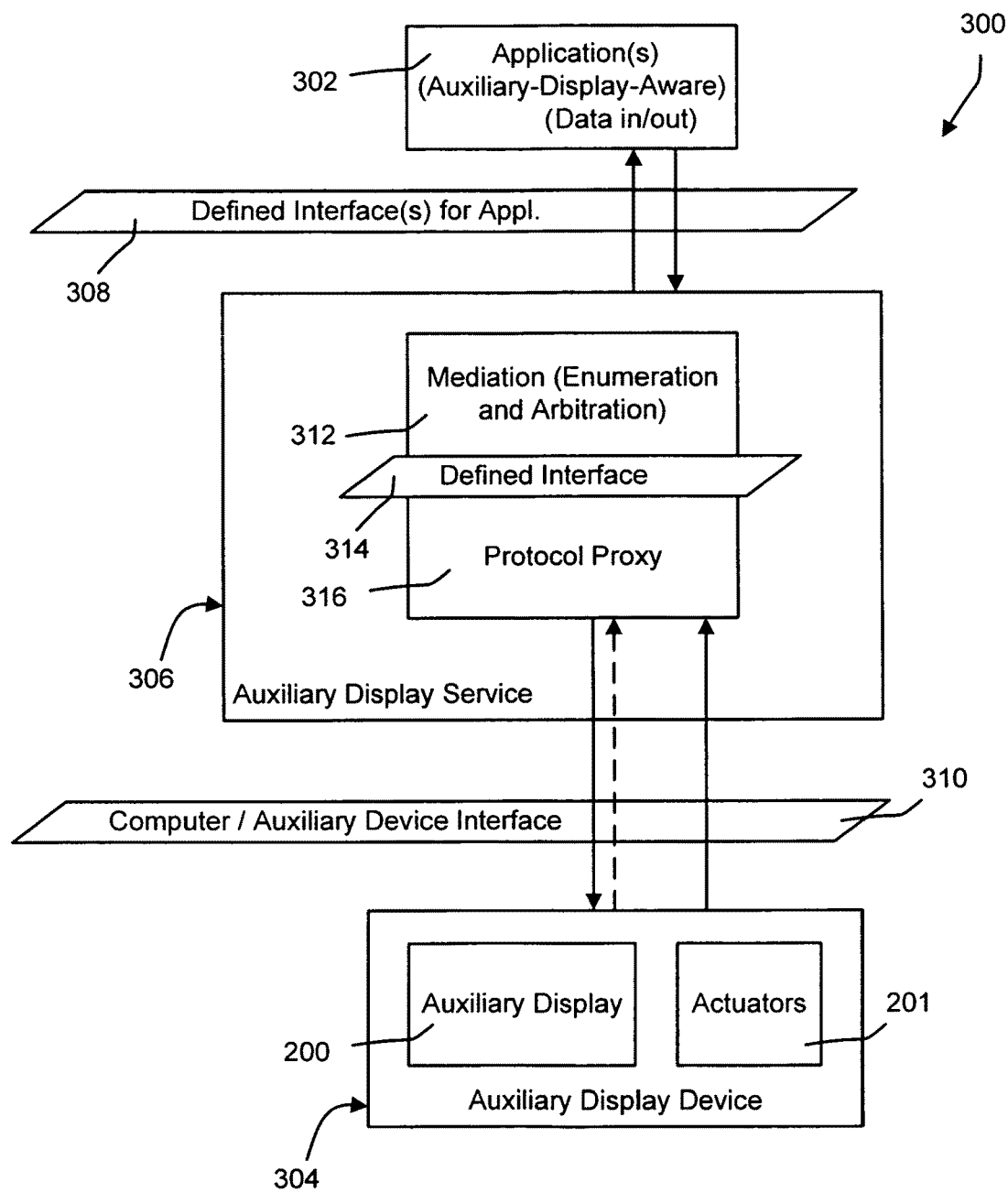
FIG. 3 is a block diagram generally representing a layered architecture by which application programs can exchange data in an abstracted manner with an arbitrary auxiliary display device, in accordance with an aspect of the present invention.

As generally represented in FIG. 3, there is provided an architecture 300 by which one or more application programs 302 can interface with virtually any type of auxiliary display device 304, to output data to its display 200 and/or interact with the user via actuators 201. Such an application program 302 (or via an associated plug-in component coupled to the application program) is one that has been programmed to know of auxiliary displays (that is, are auxiliary-display-aware), and thus can use an auxiliary display device 304 whenever one is present to exchange information with a user and thereby provide an improved user experience. Note that as used herein, the concept of an "application" or "application program" represents conventional programs as well as operating system components that may want to provide data to an auxiliary display and/or have interpretation occur therewith through an auxiliary display device's associated actuators.

To allow any auxiliary-display-aware application program 302 to use an auxiliary display device 304, an auxiliary display service 306 is installed on a computer system, providing an application model/layer through which application layer programs running on the normal computer operating system can communicate with the auxiliary device 304 to display information on its display 200 and/or receive commands such as navigation commands via actuators 201. To this end, the application program 302 exchanges data, via defined interfaces 304, with an auxiliary display service 306 (of a service layer). In turn, as described below, the auxiliary display service 306 exchanges the data with the auxiliary display device 304. As a result of this highly flexible model, any program, including those not yet developed, can thus use the auxiliary display device 304 by properly implementing the defined interface set 308.

Further, in one implementation the auxiliary display service 306 abstracts the auxiliary display device hardware (as well as any device firmware or software) from the other layers, whereby any suitable device can serve as an auxiliary display device, including devices not yet developed. To this end, the architecture 300 provides a protocol layer, by which the service 306 communicates with the device firmware/hardware over a suitable communication protocol/interfaces and wired or wireless device interface 310. Any existing or future protocol that the display service 306 and auxiliary display device 304 both appropriately implement will suffice, as will any corresponding physical or wireless computer-to-device interface 310 (including those not yet developed).

As described below, in one implementation, the mediation component 312 (e.g., that handles enumeration and arbitration) is abstracted from the communication mechanisms via a defined interface 314 into which a protocol proxy 316 plugs in, as appropriate for the communications protocol being used. Note that the protocol proxy is shown in FIG. 3 as being part of the auxiliary device service 306, however what is considered part of the service is somewhat arbitrary, and thus the protocol proxy can be alternatively considered as part of the protocol layer. In any event, the layered architecture provides high flexibility to application developers and display device manufacturers.

Figure 4:
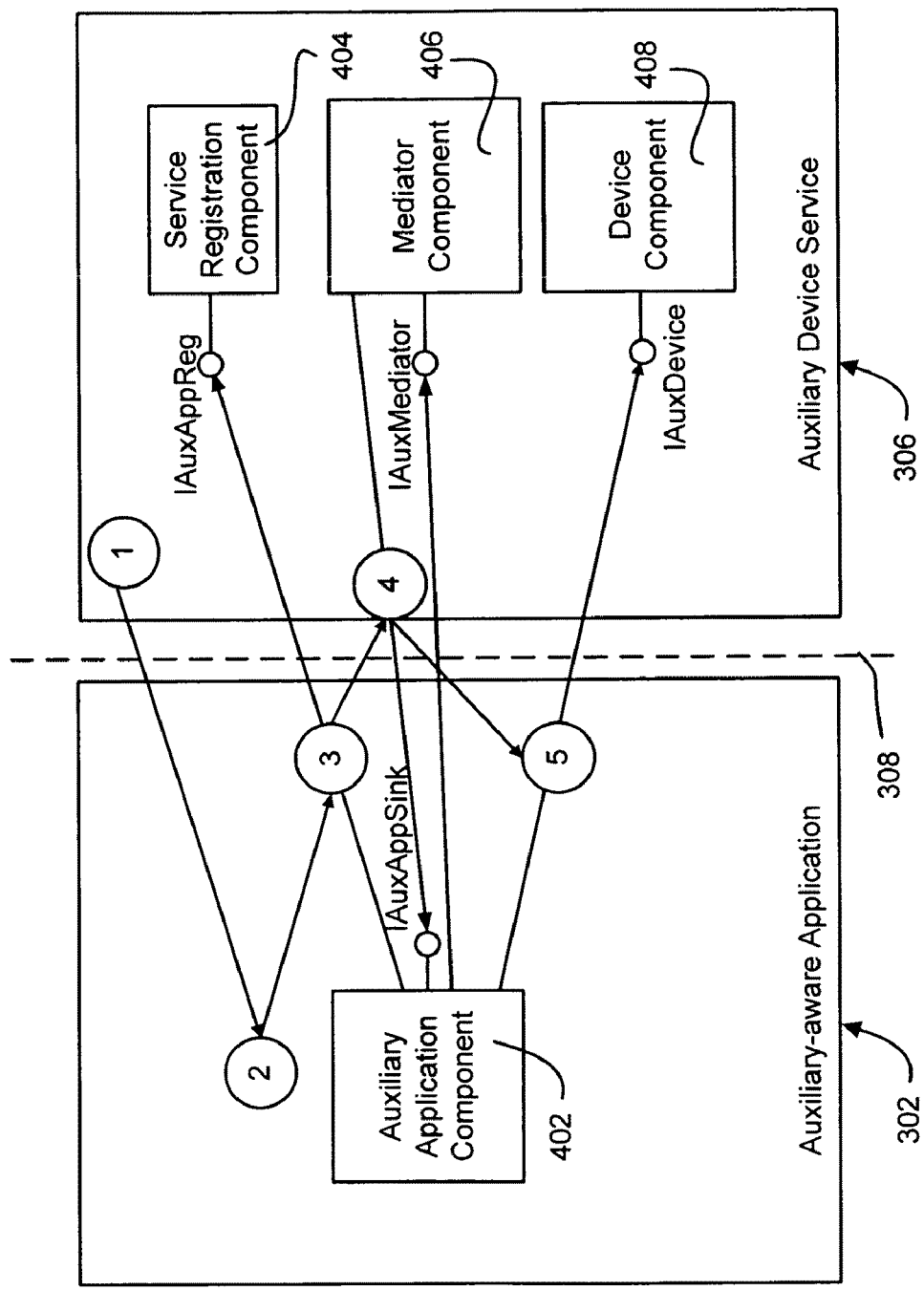
FIG. 4 is a representation of how in one implementation, an auxiliary-aware application program interfaces with an auxiliary display service to exchange data with an auxiliary display device, in accordance with an aspect of the present invention.

Turning to FIG. 4 and an explanation of the application and service layer operations, an application program 302 may be extended as desired to present some of its data to users via an auxiliary display device 304. This may be accomplished by developing the application program 302 to directly understand the auxiliary display service interfaces 308, and/or by associating with the application program 302 a component that understands the interfaces 308. For example, a plug-in (e.g., in the form of a DLL) allows application developers to easily extend their application programs without changing the main application code (except to link to the plug-in). Note that FIG. 4 depicts the auxiliary application component 402 as being within the application program 302, however it is understood that this is only a representation and thus the component 402 may be within the application code itself or be a pluggable component such as a DLL plugged into the application. Further, it should be understood that the application program itself may not be providing its data for display. For example, another program that may be independent of the application program may present data corresponding to the application program; to this end, for example, by hooking the application program's function calls, the other program can provide data to the auxiliary display device 304 that appears to be coming from the application program.

As represented in FIG. 4, the application-to-service layer provided by the auxiliary display service 306 enables various structure and functionality, including auxiliary plug-in registration by which an application/plug-in registers itself with a service registration component 404 of the auxiliary display service 306, whereby the application/plug-in has the ability to use the available auxiliary device 304. In the example implementation of FIG. 4, the service registration component 404 provides an IAuxAppReg interface for this purpose. Other application programs likewise register themselves via this interface.

The auxiliary application component 402 has ability to receive events from the associated auxiliary display device and/or related resources. For example, an event may be sent to the auxiliary application component 402 upon an auxiliary device becoming available for sending data thereto, while another event could correspond to user interaction with the auxiliary device actuators. In the example implementation of FIG. 4, the application program implements an IAuxAppSink interface to receive such events.

As also described above, the application program 302 has the ability to enumerate the available auxiliary hardware device or devices that are available. In the example implementation of FIG. 4, a mediator component 406 in the auxiliary device service 306 provides the enumeration via an IAuxMediator interface. In this manner, the device or some data related to the device (e.g., a corresponding XML file) can report the capabilities of the device display screen or the like and/or its actuators to the application program 302. The application program 302 may then adjust the output and input according to the display, e.g., color scheme, resolution, navigation commands, and so forth can be modified for the device characteristics. For example, if an application program 302 knows that the auxiliary display device has a high-resolution color screen and four-way navigation buttons, that application can output richly formatted data to the auxiliary display and adjust to accept navigation commands in four directions. Alternatively if only a two-line text display is available, the application program 302 can output simple text.

Arbitration is also provided in the mediation component 406 of the application layer, to provide the mechanism that determines which application should be having its data currently displayed and receiving navigation commands. Note that the application programs take turns sharing the display as appropriate; in other words, the arbitration function of mediation manages the priority (z-order) of the auxiliary application programs and/or plug-ins. Because auxiliary devices may have only small amount of display space, (or even be as little as a single LED), in one implementation only one application gets the entire display at a time, although it is feasible in alternative implementations to split a display and/or indicators among applications at the same time if sufficient screen space is available or a screen and indicators are available on the same device, or otherwise provide information from two or more applications (e.g., the device could show one application's data but flash when another application is in a changed state, essentially requesting but not demanding that the user pay some attention).

Arbitration is also provided in the mediation component of the service layer to provide a mechanism that determines which application or operating system component should be having its data currently displayed; note that the application and other programs take turns sharing the display as appropriate. Often the program currently coupled to (similar to having focus on) the display device was user-selected, such as by navigating to from a home page, however other events may take precedence over the user's selection (which may have been made long ago). For example, if an event occurs such as a meeting reminder, a phone call, a return to home page timeout, a low power condition, or something that is considered likely more important to display than what is currently being displayed, the auxiliary display can change, either entirely to show another application's data or a shell application home page, or in some way (e.g., flash) to indicate the event.

Note that it is possible to more have more than one auxiliary display, and also one or more indicators such as LEDs, whereby arbitration determines the data mapping between application programs and the like to and from each such display and/or indicator.

Once a program is allowed to write to the display and receive commands via its actuators, auxiliary system referencing provides the ability to blit/render to an abstracted memory buffer that allows the currently selected auxiliary application (e.g., plug-in) component 402 to use the display resources. In the example implementation of FIG. 4, a device component provides an IAuxDevice interface for the application program to provide its data to the device via the service layer. Note that application data may be processed before passing through the service layer, e.g., to structure the data in some manner such as a tree or graph to facilitate rendering as well as caching, as described in the U.S. patent application entitled "Caching Data for Offline Display and Navigation of Auxiliary Information," and filed on May 3, 2004, which application is expressly incorporated herein by this reference.

By way of summary, the arrows labeled with circled numerals one (1) through six (6) correspond to the generalized timeline of an auxiliary application's boot-strapping and execution. As represented by arrow one (1), the auxiliary device service begins. At arrow two, as part of its initialization process the service creates out-of-process application COM objects. The out-of-process COM objects support the IAuxAppSink interface.

As represented by arrow three (3), the auxiliary application component (e.g., an object) calls into the IAuxAppReg interface of the service registration component (e.g., an object method) of the auxiliary device service 306 to subscribe to one or more auxiliary devices. Each available device may be listed by a specific identity returned from the call, or can simply be identified as being available, in which event enumeration can determine the characteristics of each device.

As represented by arrow four (4), following registration, the registration service 404 essentially identifies the mediator component (e.g., an object) to the auxiliary application component 402, by returning an IAuxMediator object interface from the registration component. The service's mediator component (object) keeps a copy of the IAuxAppSink interface so that the mediator 406 can request that the application component 402 respond to an actuator event draw on a display or set the state of an indicator.

Numbered arrow (5) in FIG. 4 represents the mediator component 406 passing an IAuxDevice interface to the auxiliary application via IAuxAppSink. The application in turn uses that interface to actualize the request via the device component.

Figure 5:
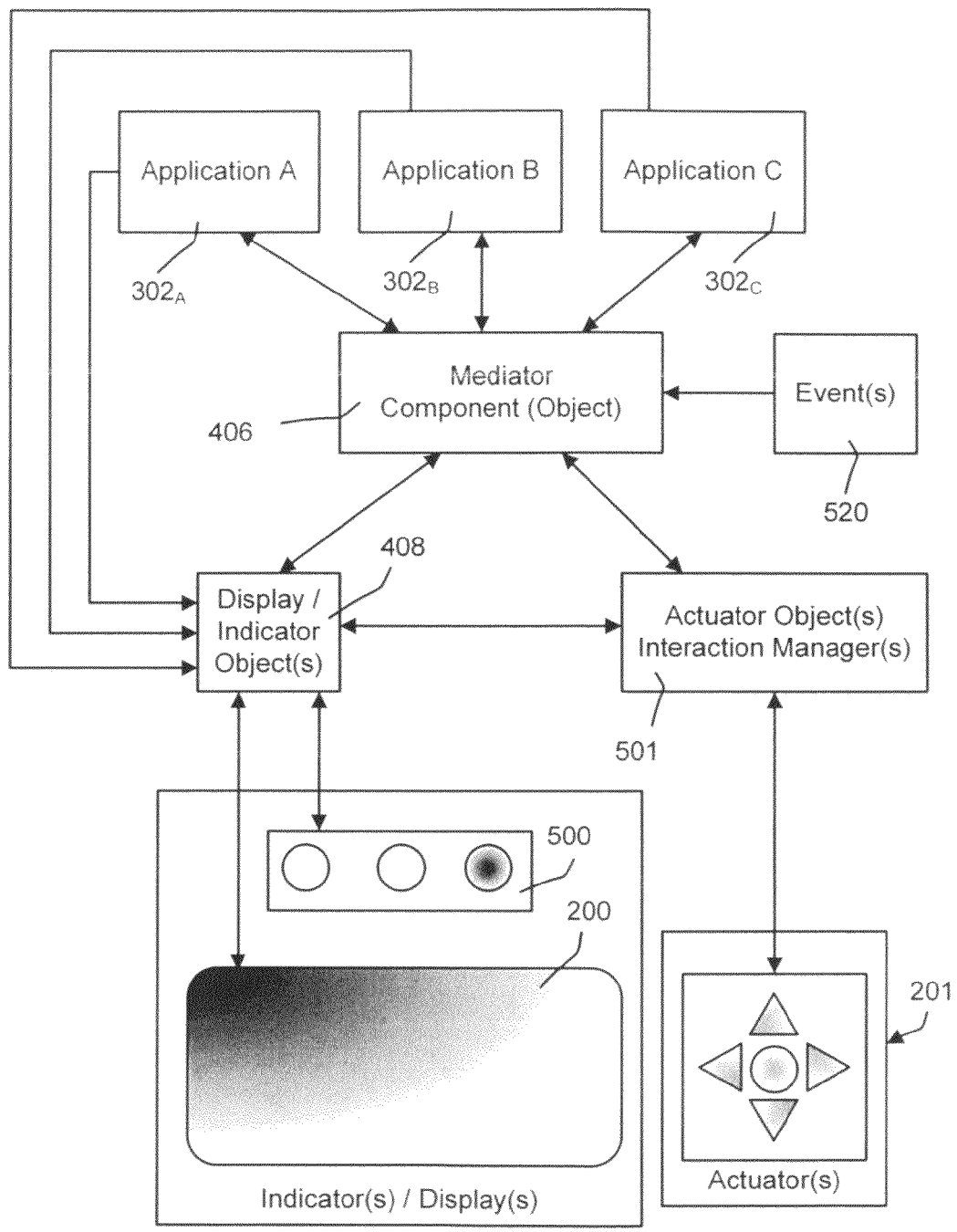
FIG. 5 is a block diagram generally representing multiple application programs each capable of selectively coupling for data exchange with an auxiliary display device based on mediation, in accordance with an aspect of the present invention.

FIG. 5 shows multiple application programs 302$_A$-302$_C$ connected to a mediator component (object) 406. Although three such application programs 302$_A$-302$_C$ are shown, it is understood that any practical number is feasible. In general, the mediator component 406 determines which application program should be currently having its data displayed on the auxiliary display 200 (and/or on a set of one or more indicators 500), and/or should be receiving user input data from the actuators 201. If more than one auxiliary display device is present, the mediator component (object) 406 maps the applications to the devices; at anyone time, different auxiliary devices may each display via indicators or a display screen the data of a different application program, or anyone application may have its data displayed on more than one auxiliary device at a time. Note that the same application thus may output data to two or more displays, however the application's data may be different for each auxiliary device. For purposes of simplicity, the following explanation will refer to a single auxiliary display device that outputs to a display (rather than to an indicator set).

In FIG. 5, an actuator object referred to as an interaction manager 501 manages the user interactions with the actuators 201 corresponding to the auxiliary display. This interaction may include the user input of navigational commands that tell the mediator component (object) 406 to change which of the applications is to have its data displayed. The command may also be one directed to the currently auxiliary-display-active application program, e.g., to display some of its data such as the body of a selected email message. Alternatively, an event 520 such as a timed event may be received and processed by the mediator component 406 to make such a change automatically in response to the event. A lookup table or the like maintained by the mediator component can map events (or internal timers) to actions It should be noted that the interaction managers need not rely entirely on the application programs to change the display. For example, a "home page" program that lists available application programs from which a user can select may be built into the interaction manager and/or the display object 408. Until an application is selected, the home page program adjusts the display (e.g., highlights and/or scrolls a list of available applications) in response to user interaction with the actuators 201 until the user selects one of the applications.

In one implementation, upon detection of such an application selection or other change request (e.g., event based), the mediator component 406 sends an event to the newly selected or currently selected application to instruct that application to provide appropriate data to the display object 408 for display. If changing from one application program to another such as because of a timed event, or changing back to the home page, the mediator component 406 may also send an event to the formerly active application to indicate that it no longer is having its data displayed. Note that with multiple displays and/or indicators, the mediator component can remap applications to display objects when changes occur, and thus a mechanism for indicating which display, displays and/or indicators that an application is outputting data to may be needed to inform the application of how to tailor its data for another device.

The display object for any auxiliary display device can ensure that data is appropriate for its corresponding display, e.g., text to an LED would be meaningless (unless that text corresponded to a particular display state such as a color and/or flash pattern). Further, the display object can reformat data as appropriate, e.g., color to grayscale, text to a bitmap for display, and so forth.

The actuators 201 can also change the state of a currently selected application program that is having its data displayed. For example, when selected, an email application program can display a list of email messages, which can be scrolled by the application program in response to received actuations at appropriate buttons. Upon selection of an email message, the application may change its state to output the contents of the selected message rather than a list of messages.

Beneath the application-related layer is a protocol layer accomplished via a communications-related interface into which a protocol proxy (e.g., a DLL) plugs in. Because of the protocol layer, the communication details and requirements are abstracted from the application programs and the mediation component.

Moreover, the protocol is not fixed, but rather is configurable via a pluggable protocol proxy. Thus, essentially any protocol may be used as agreed upon with an auxiliary device, including protocols not yet developed. Note that the plugging in of the proxy may be automatic or largely automatic in response to the initial detection of the presence of a coupled auxiliary display. For example, a user can couple a smart mobile telephone to a computer, and when the coupling is detected, the display of the mobile telephone can become an auxiliary display by automatically loading an appropriate protocol proxy.

Because of the layered architecture, both the application programs and the auxiliary display device in essence see only an auxiliary device service, which has the respective interfaces needed to properly exchange data. In this manner, communication from any application to any auxiliary display device is possible for which an agreed-upon protocol exists, (e.g., to connect over a USB HID, Bluetooth, and so on, and even, for example, to connect to a web service located essentially anywhere in the world).

Figure 6:
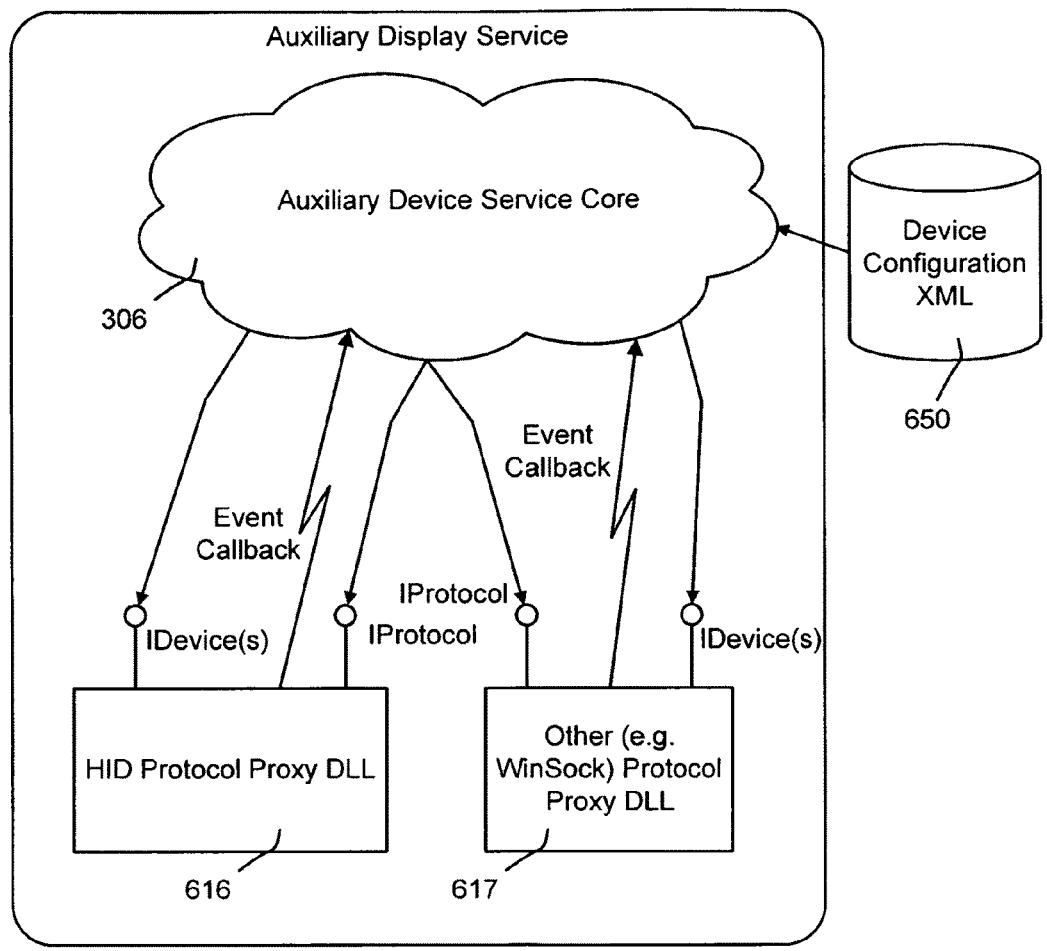
FIG. 6 is a block diagram generally representing components of the layered architecture including firmware by which offline and online operation of an auxiliary display device is possible, in accordance with an aspect of the present invention.

Turning to FIG. 6, the protocol (sometimes referred to as a hardware abstraction) layer of the auxiliary device service 306 is the abstraction that enables the application plug-ins to be routed to one or more of a variety of devices. In one implementation, the physical means of output can vary from as little as a single LED to a full color bitmap auxiliary display, or virtually anything in between (e.g., an alphanumeric display, an auxiliary display with custom segmenting, $2^n$-bit small grayscale bitmap displays, 32-bit larger bitmap displays and so on). The input capabilities also vary, e.g., the actuators can vary from buttons, to switches to capacitive or other sensors including light sensors, motion sensors, mass sensors and so on.

As shown in FIG. 6, in one implementation the protocol proxy comprises a DLL that enables the application content to be directed to a physical device. IDevice and IProtocol interfaces of the proxy are exposed to core code of the auxiliary device service 306, which receives callback events from the proxies. In the example of FIG. 6, examples 616 and 617 are shown for a Universal Serial Bus/Human Interface Device (USB/HID)-based auxiliary display and a WinSock based endpoint, respectively. Note that it is possible to have multiple auxiliary displays having different communication protocols active at the same time. The auxiliary device service maintains data 650 (e.g., an XML-formatted device configuration list) of the protocol proxy providers and their respective capabilities.

Note that to this point, the computing environment has been described with applications actively running on the main computer in conjunction with the operating system running (ACPI state S0), referred to herein as an "online" state. However, in alternative scenarios, the auxiliary display can have its own CPU and memory, and this firmware can operate the auxiliary device when the main computer is "offline," e.g., the computer is powered down to some extent, e.g., completely powered down or in a sleep/hibernation state, or the like (Si or higher ACPI sleep state). If such firmware is present, the auxiliary device can display data while the device is online or offline. If not present, the auxiliary device is only capable of working in an online state. In the online capable only state, the applications and various components described above run on the main CPU under the operating system.

Figure 7:
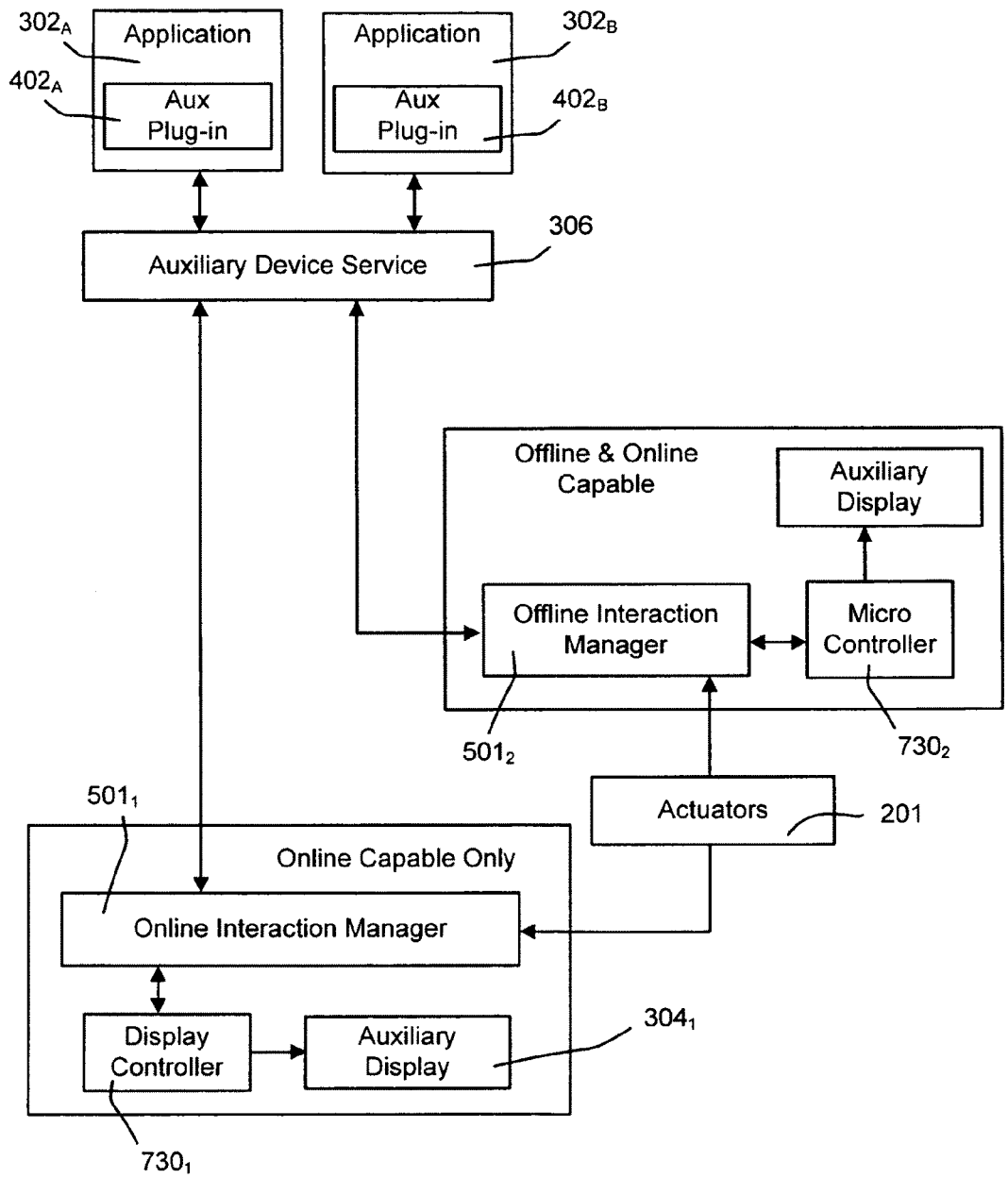
FIG. 7 is a representation of an auxiliary display service in one implementation being able to operate with different types of display devices, in accordance with an aspect of the present invention.

FIG. 7 generally represents the relationship between applications $302_A$ and $302_B$ (in this example having respective auxiliary plug-ins $402_A$ and $402_B$) and the interaction managers when in either one of these two scenarios, namely online capable only or online/offline capable. When online only, the online interaction manager $501_1$ (running in the main CPU operating system) receives user input and via the auxiliary display service 306, may pass corresponding data to the currently selected application program and/or a display controller $730_1$ for processing. Note that this is essentially as described above with respect to FIG. 5. Further, note that even though a device may be offline-capable, these online components may be run whenever the main system is online, because the processing power and memory are usually greater in the online state, and because the applications are running with actual data instead of cached data.

When offline, a different offline interaction manager $501_2$ is used. As is understood, the offline interaction manager $501_2$ runs under the auxiliary microcontroller/and offline (e.g., flash or alternatively powered) storage. In general, the offline interaction manager $501_2$ manipulates cached data in response to navigational commands from the actuators 201. An offline shell program, which may be considered part of the offline interaction manager $501_2$ (although it may be a separate component), may provide a home page and includes navigational logic that determines what image (e.g., a bitmap) to display, or what content should be interpreted for rendering to the display, such as by a renderer in the shell. Note that the same actuators and auxiliary display may be used on an online/offline capable device, regardless of whether online or offline, although there may be some differences in what can be displayed due to limitations of the auxiliary processor and/or memory. For example, the resolution of the image may differ if cached bitmaps are used for the offline scenario and space is limited. Note however that there may be advantages to formatting the data sent to the display device in a common navigational (e.g., tree or graph) structure for online and offline, including that the user gets a similar experience and that the various components need not be configured to process different structures depending on the online or offline state. However, the actual data that can be displayed may differ, e.g., if not all of the applications' data may be cached for offline viewing due to storage space limitations, the amount of data to cache is reduced in size (e.g., a tree structure is pruned), as described in the U.S. patent application entitled "Caching Data for Offline Display and Navigation of Auxiliary Information," and filed on May 3, 2004, which is expressly incorporated herein by this reference.

Context-Aware Auxiliary Display Platform and Applications

Figure 8:
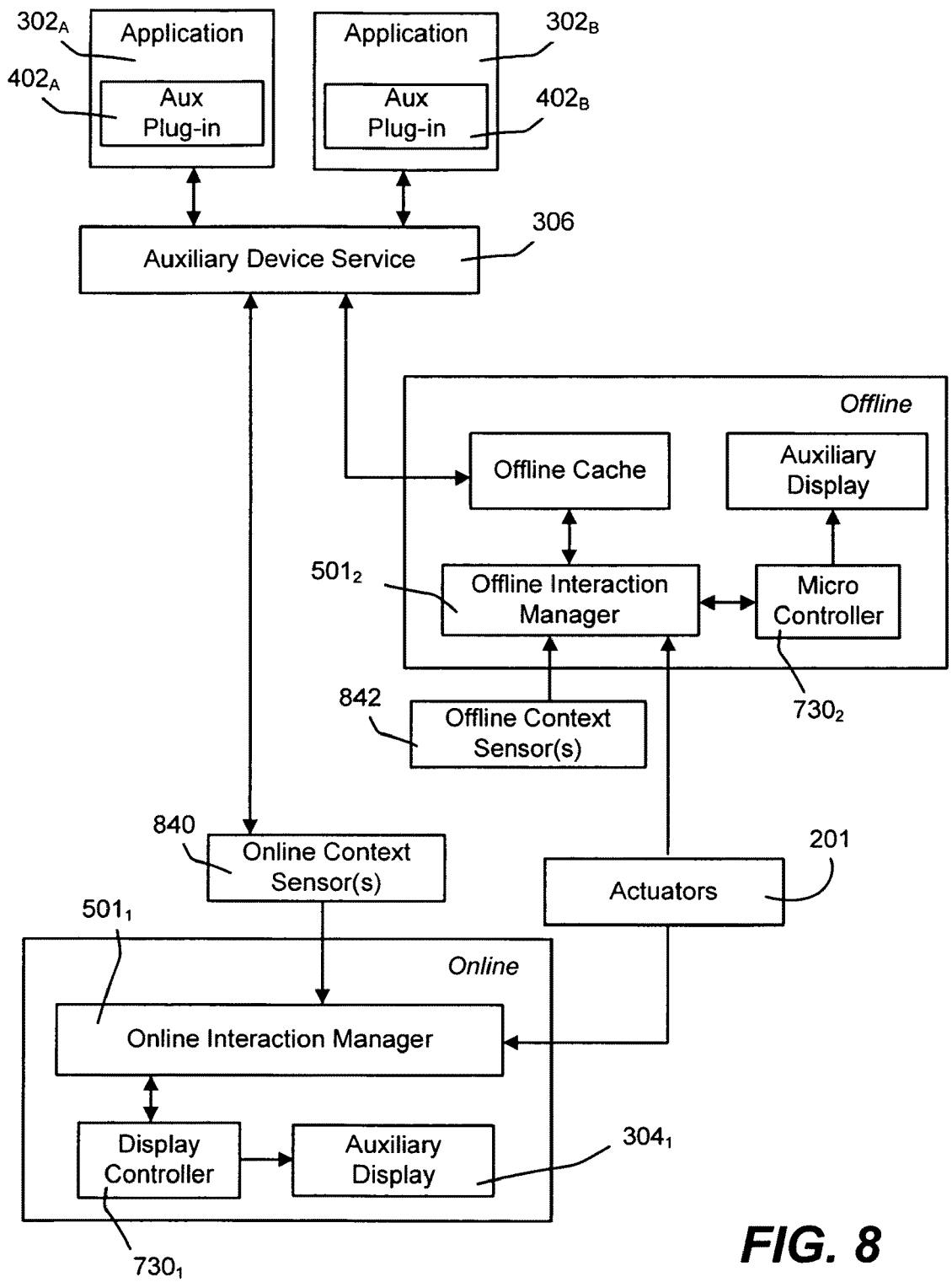
FIG. 8 is a block diagram generally representing components including firmware by which offline and online operation of an auxiliary display device is possible, in accordance with an aspect of the present invention.

FIG. 8 is a representation similar to that of FIG. 7 but adding the concept of a context sensor. In FIG. 8, the context sensor or sensors are shown as being separate sensors 840 and 842 for online or offline context sensing, respectively, but as will be understood, the some or all of the sensors may be the same and shared between the states.

In accordance with an aspect of the present invention, in general, a context sensor determines some context change, and reports it to the main computer system and/or the auxiliary device. The reported context change is then used to take some action with respect to what information is displayed on the auxiliary display device, or take some other type of action.

In the offline state, the change in context can have some effect on the cached data, such as to interpret or use the cached data differently based on the current context state, or to possibly add to or delete from the cached data. By way of example, if a sensor detects the presence of another person along with the user of the system, any information in the cache that was previously identified by the user as sensitive can be pruned, and restored at another time. Thus, in a meeting, a user will not inadvertently be showing his or her email messages to other attendees that can see the auxiliary display. Similarly, if an auxiliary display is mounted on the lid of a laptop computer, and that lid is open, the user of the device cannot see the auxiliary display, but others can, and thus any sensitive information ordinarily should not be displayed when the lid is open. In both of the above examples, the current context is what determines the desired display output, and thus sensing that context can control the display.

Note that context-awareness works with both online and offline operation, with a difference being that when online, context changes may be communicated to online application programs or operating system components, whereas when offline, the context change will be used to modify usage of the cached data and/or any other data obtained by the auxiliary firmware. Such other data which may be added to the cached data or merged therewith is described in the aforementioned U.S. patent application entitled "Processing Information Received at an Auxiliary Computing Device." Also, the sensors may be different or at least differ in number from online to offline, e.g., some sensors may report to the operating system, and for a portable auxiliary device, the sensors attached to that device will go with the device while others attached to the main computer system will remain with the main computer system.

When in an online state in which both the main computer system and the auxiliary device are operating, the context changes that are communicated to the online application programs and/or the operating system components are used by the application programs and/or operating system (and/or the auxiliary device itself) as each recipient of the communication sees fit; as a result, the context changes can temporarily or permanently change the main computer system and/or auxiliary device, e.g., by changing a registry or other setting. Note that changes reported to the main computer system's programs may have occurred at a time when the main computer system was offline, and if so are preserved by the auxiliary device and reported when the main computer system comes back online. In the online case, various context data can be reported to applications that have registered for use of the auxiliary display. Various types of context may be sensed, such as context corresponding to physical location of the display or main computer system, movement or motion data, presence of a particular user or others, power state, network connectivity status, privacy status and so forth.

The auxiliary-devices-aware applications alternatively may be referred to as plug-ins, even though the auxiliary code may not actually be a plug-in but rather part of the main application program code, as described above. The application can register (or query) for the particular context-sensitive behavior before the system goes offline. The auxiliary device can thus send context-sensitive events as they are detected or some appropriate time after detection, or can maintain context-related data for responding to a query. The auxiliary device can also obtain the context-related data on-demand, such as in response to an application program query, and/or can occasionally poll one or more sensors as appropriate. The auxiliary device can also re-send context-related events, such as for the benefit of applications that were not running and/or registered at the time the event was last sent.

In keeping with the present invention, plug-ins can register to be available in more than one power state. For example, a calendar plug-in is appropriate when the system is online or offline, but live stock quotes received via the main computer system are not appropriate for caching for offline use. Plug-ins can also register to be available in more than one location. For example, a battery meter is appropriate when the auxiliary display is located on the bezel of a laptop computer or on its lid, or both.

When developing an auxiliary display plug-in, the developer may specify an appropriate context (or contexts) in which the application may be displayed, (or should be displayed upon a context change), or cannot be displayed. The service may also communicate the change in context event to the plug-in, which may adjust its future output accordingly. A plug-in may register for changing the display upon a context change, e.g., automatically present a certain display when a Bluetooth device is in range. Moreover, if the Bluetooth device becomes available as an auxiliary display, each appropriately registered application plug-in may be notified of the context change, so that, for example, the plug-in can adjust its output for the new device.

The auxiliary service 306, which is aware of the current system context, can chose which plug-ins it is appropriate to display data from and which to disable, based on the current context. To this end, in one implementation, when a context state change occurs, the auxiliary service enumerates the list of enabled plug-ins to determine if any should be added or removed based on that context change. When running in the offline state, the firmware or operating system running on the auxiliary processor can apply the same context filter to disable plug-ins that are no longer relevant in the offline power state. Alternatively, a different filter can be applied.

Examples of various contexts include power state, which determines in what power states the plug-in's corresponding information will be displayed, whether the source of the information is the plug-in's corresponding application program or cached data for that application program. The auxiliary service 306 is aware of changes to the power state of the system via the existing system notifications plug-in power state options include online (S0) in which the plug-in is appropriate when the system is online, and offline (S3-S5) in which the plug-in is appropriate when the system is offline. A plug-in can register to be available online and offline.

Another context is relative display location, and may be used to determine whether the plug-in will display information based on the location of the auxiliary display in relation to the main computer system's primary display. The manufacturer may register the position of the auxiliary device as part of the system configuration, or the user can identify the location to the system, such as for a custom location that does not quite fit any defined category or if the user wants to override the registered position. Each plug-in can then register with the auxiliary service 306 as to which locations it is appropriate to be run in. For example, plug-in location options include visible with the primary display, e.g., the auxiliary display is in a location such that it is visible at the same time as the primary display, such as on the bezel of a laptop. Another location is not visible with primary display, e.g., the auxiliary display is in a location such that it is not visible at the same time as the primary display, such as if mounted on lid of a laptop, and thus only visible when the lid is closed or from the other side of the main display. Another location that can be registered is remote display, indicating that the auxiliary display is either detachable from the main PC or is on a separate device connected via a remote connection, (e.g., via Bluetooth to a mobile telephone). A plug-in can register to be shown in any combination of the location options.

Network connectivity is another context that can be detected, and can be used to determine if the plug-in will display information based on the current network connectivity status plug-in network connectivity options include wireless connected, Ethernet connected, Bluetooth connected and no network connection. A plug-in can register to be shown in any combination of the network connectivity options. The auxiliary service is aware of the current network status via existing API's. In the offline case, the firmware or operating system on the auxiliary processor may have access to the network and can set the status for the plug-ins as appropriate.

A different type of context sensing is detecting the actual physical location of the device, such as work or home. For example, if a user comes home from work and a different wireless networking is detected, that context change can be reported to the user's email application program which will then adjust to output email messages addressed to the user's personal address on the auxiliary display, instead of email messages for the user's work email address. Global positioning system (GPS) data can also determine a location, as can sensing a user's current location and velocity to predict a future location and thereby adjust output data accordingly.

Information sensitivity determines whether the plug-in will be displayed based on the perceived sensitivity of the information and the user's current context. The context may be selected by the user based on a current situation and passed to the auxiliary service or firmware/OS. A heuristic determines which level of information should be shown based on the user selected context and other pertinent information.

For example if a second user uses Terminal Services to access the laptop at the same time another user is logged in, it may be appropriate to not show private information on the auxiliary display. Another example is of the user leaving his or her computer unattended, whereby it would be desirable to prevent private information from being while unattended plug-in information sensitivity options include system data, where the plug-in has no personal information at all (e.g.

battery meter), and user data, in which the plug-in contains data related to a user's personal preferences but it is not private data (e.g. weather forecasts by a zip code or user selected stock quotes). A more sensitive option is personal information, such as when the plug-in contains data specifically related to a user but not necessarily private, such as a music playlist. Private information indicates that the plug-in contains information that should be considered private (e.g., calendar email). In one implementation, a plug-in can only register for one of these options. In alternative implementations, a finer granularity is feasible, e.g., some of a plug-in's data is flagged at one sensitivity while other data is flagged as another, and the time for designating the sensitivity is not at the time of registration.

As can be appreciated, virtually any context that may be sensed can be used to alter the presentation of a program's data upon a context change. This can be based on rules that are provided by the program in advance of the context change, or by notifying the program of the context change an? letting the program adjust its output.

Moreover, the auxiliary device (e.g., through its actuators) is also able to change context. For example, a button pressed on the auxiliary display device actuators may change the power state (e.g., turn on/off/standby/hibernate) the main system such as a laptop computer. Alternatively, the pressing of a button on the auxiliary display may be used to cause the main system connect to a wireless network.

As can be seen from the foregoing, the present invention enables various context application programs (plug-ins) to provide data at appropriate times to an auxiliary display of a computer system, while at the same time allowing virtually any capable display, whether built-in as a dedicated auxiliary display or an independent device display, to serve as an auxiliary display. The present invention thus provides numerous benefits and advantages needed in contemporary computing with auxiliary display devices.

While the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention.

What is claimed is:

1. One or more storage devices having stored thereon computer executable instructions that, when executed by one or more processors of a computer system, implement a method for controlling the display of application data on a main display of the computer system and on an auxiliary remote display device of a separate device connected to the computer system via a remote connection, the method comprising:
   an act of the computer system identifying that a remote display is available to the computer system, the remote display belonging to a separate device connected to the computer system via a remote connection;
   an act of the computer system identifying one or more display capabilities of the remote display, including at least a display resolution of the remote display;
   an act of the computer system determining that a context change has occurred in the computer system;
   in response to identifying the context change, an act of the computer system enumerating a list of enabled plug-ins selected from a plurality of available plug-ins, each of the plurality of available plug-ins specifying one or more context properties that specify one or more contexts corresponding to a display of application data from a corresponding application program on the remote display;
   based on the list of enabled plug-ins and the identified context change, an act of the computer system permitting a particular application program corresponding to one of the enabled plug-ins to send supplemental application data for the particular application program over the remote connection to the separate device for display at the remote display, the supplemental application data formatted for the one or more display capabilities of the remote display, while the particular application program concurrently displays primary application data for the particular application program at a main display of the computer system;
   an act of the computer system receiving user input to the particular application program over the remote connection from the separate device while displaying the primary application data for the particular application program, the user input causing a change in state of the particular application program that changes the primary application data displayed at the main display, the user input generated by a user interacting with the displayed supplemental application data at the remote display using one or more actuators of the separate device; and
   based on the received user input and the change in state of the particular application program, an act of the computer system permitting the particular application program to send any changed supplemental application data over the remote connection to the separate device for display at the remote display, while the particular application program concurrently displays the changed primary application data at the main display.

2. The storage device of claim 1, wherein the separate device also independently enables and disables one or more plug-ins based on context.

3. The storage device of claim 1, wherein the context change comprises an estimation of future location of the computer system based on a current location and velocity of one or more of the computer system or the separate device.

4. The storage device of claim 1, wherein at least one plug-in applies different behavior to different application data based on a relative sensitivity of the application data.

5. The storage device of claim 1, wherein the remote display has limited display capabilities compared to the main display.

6. The storage device of claim 1, wherein at least one of the plurality of available plug-ins specifies one or more context properties that makes at least some application data unavailable for display on the remote display based on the presence of other people near one or more of the computing device or the separate device.

7. A method implemented within a computer system that includes one or more processors and memory storing instructions which, when executed by the one or more processors, implement the method for controlling the display of application program data on a main display of the computer system and on a remote display of a separate device connected to the computer system via a remote connection, the method comprising:
   an act of the computer system identifying that a remote display is available to the computer system, the remote display belonging to a separate device connected to the computer system via a remote connection;
   an act of the computer system identifying one or more display capabilities of the remote display, including at least a display resolution of the remote display;

an act of the computer system identifying that a context change has occurred in one or more of the computer system or the separate device;
in response to identifying the context change, an act of the computer system enumerating a list of enabled plug-ins selected from a plurality of available plug-ins, each of the plurality of available plug-ins specifying one or more contexts associated with a display of application data from a corresponding application program on the remote display;
based on the list of enabled plug-ins and the identified context change, an act of the computer system permitting a particular application program corresponding to one of the enabled plug-ins to send supplemental application data for the particular application program over the remote connection to the separate device for display at the remote display, the supplemental application data formatted for the one or more display capabilities of the remote display, while the particular application program concurrently displays primary application data for the particular application program at a main display of the computer system, the supplemental application data being different from the primary application data;
an act of the computer system receiving user input to the particular application program over the remote connection from the separate device while displaying the primary application data for the particular application program, the user input causing the particular application program to change the primary application data displayed at the main display, the user input generated by a user interacting with the displayed supplemental application data at the remote display using one or more actuators of the separate device; and
based on the received user input, an act of the computer system permitting the particular application program to send different supplemental application data over the remote connection to the separate device for display at the remote display, while the particular application program concurrently displays the changed primary application data at the main display.

8. The method of claim 7, further comprising:
an act of the computer system enabling the one of the enabled plug-ins for displaying application data on the remote display of the separate device based on the list of enabled plug-ins and the identified context change.

9. The method of claim 7, wherein the context change comprises the computer system and the separate device establishing the remote connection.

10. The method of claim 7, wherein the context change comprises the separate device coming into a wireless communications range of the computer system.

11. The method of claim 7, wherein the remote display has limited display capabilities compared to the main display.

12. The method of claim 7, wherein the context change comprises the presence of other people near one or more of the computer system or the separate device, and wherein the computer system disables at least one of the plurality of available plug-ins to prevent a corresponding application program from displaying application data at the remote display, to prevent the display of sensitive information to the other people.

13. The method of claim 7, wherein the remote connection comprises a wireless remote connection.

14. The method of claim 7, wherein the remote connection comprises a wired remote connection.

15. The method of claim 7, wherein the one of the enabled plug-ins is part of the main application code of the particular application program.

16. The method of claim 7, wherein the particular application also sends additional supplemental application data to a different remote display belonging to a different separate device concurrent with sending the supplemental application to the separate device and concurrently displaying the primary application data at the main display.

17. The method of claim 7, wherein the separate device is a standalone computing device.

18. The method of claim 7, wherein:
the particular application program comprises an e-mail application, the primary application data comprises an e-mail application user interface, and the supplemental application data comprises a list of e-mail messages;
the user input generated by the user interacting with the displayed supplemental application data at the remote display using one or more actuators of the separate device comprises user input selecting an e-mail message from the list of e-mail messages displayed at the remote display; and
the different supplemental application data comprises at least a portion of the contents of the selected e-mail message, rather than the list of e-mail messages.

19. A computer system, comprising:
one or more processors;
a primary display device;
a remote communications device; and
one or more computer storage devices storing computer-executable instructions that, when executed, cause the computer system to perform a method for controlling the display of application program data on the primary display device and on a remote display of a separate device connected to the computer system via the remote communications device, comprising:
identifying that a remote display is available to the computer system, the remote display belonging to a separate device connected to the computer system via the remote communications device;
identifying one or more display capabilities of the remote display, including at least a display resolution of the remote display;
identifying that a context change has occurred in one or more of the computer system or the separate device and in response, enumerating a list of enabled plug-ins selected from a plurality of available plug-ins, each of the plurality of available plug-ins specifying one or more contexts associated with a display of application data from a corresponding application program at the remote display;
based on the list of enabled plug-ins and the identified context change, permitting a particular application program corresponding to one of the enabled plug-ins to send supplemental application data for the particular application program over the remote communications device to the separate device for display at the remote display, the supplemental application data formatted for the one or more display capabilities of the remote display, while the particular application program concurrently displays primary application data for the particular application program at the primary display device;
receiving user input for the particular application program over the remote communications device from the separate device, while displaying the primary application data, the user input causing a change in state of the particular application program that changes at least the primary application data displayed at the main display, the user input generated by a user interacting with the displayed supplemental application data at the remote display using one or more actuators of the separate device; and based on the received user input and the change in state of the particular application program, permitting the particular application program to send different supplemental application data over the remote communications device to the separate device for display at the remote display, while the particular application program concurrently displays the changed primary application data at the primary display device.

* * * * *